Feb. 24, 1953
R. M. NELSON
2,629,120
DOCK PLATE
Filed July 22, 1947
2 SHEETS—SHEET 1
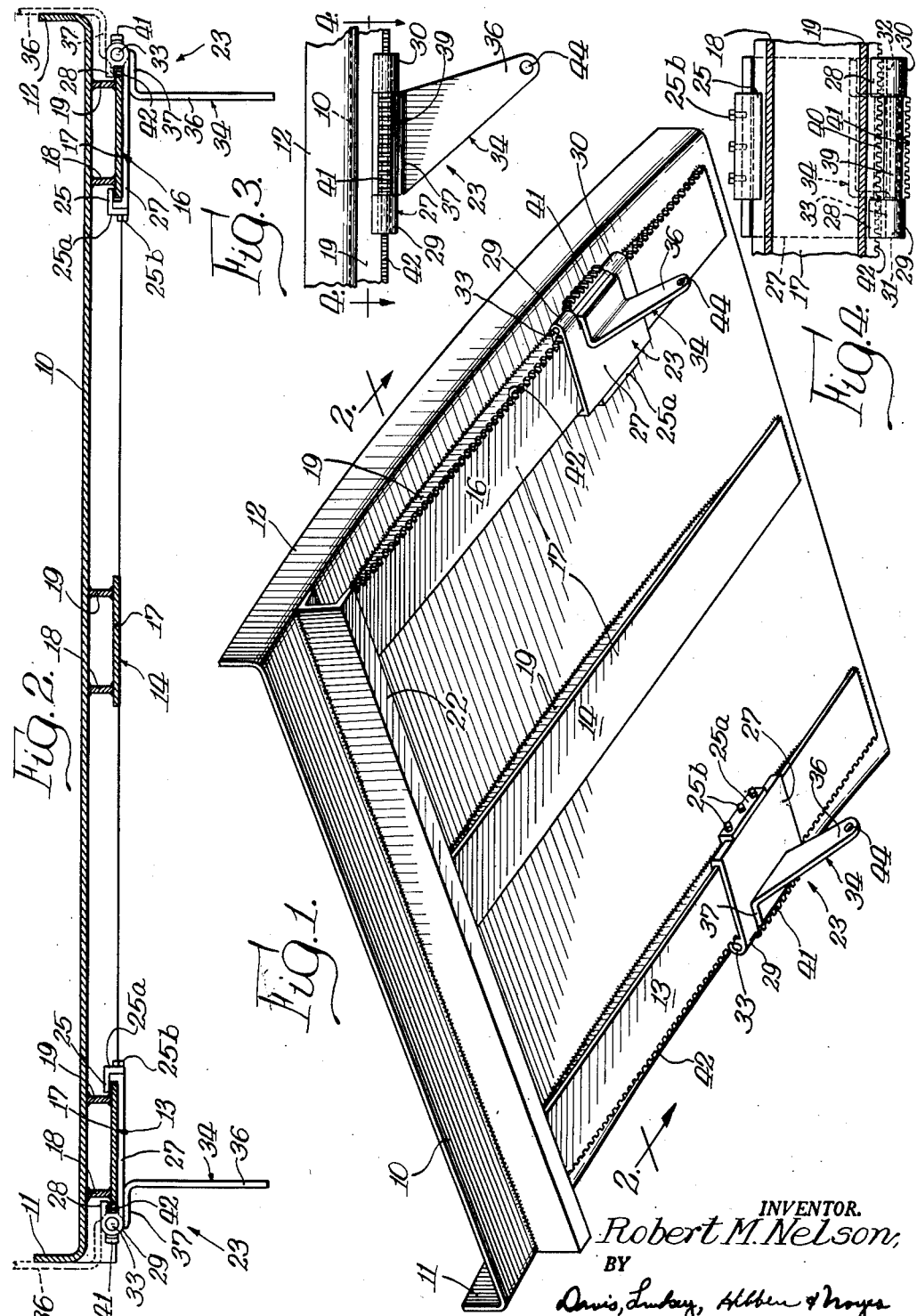
INVENTOR.
Robert M. Nelson
BY
Davis, Lindsey, Hibben & Noyes
Attys.

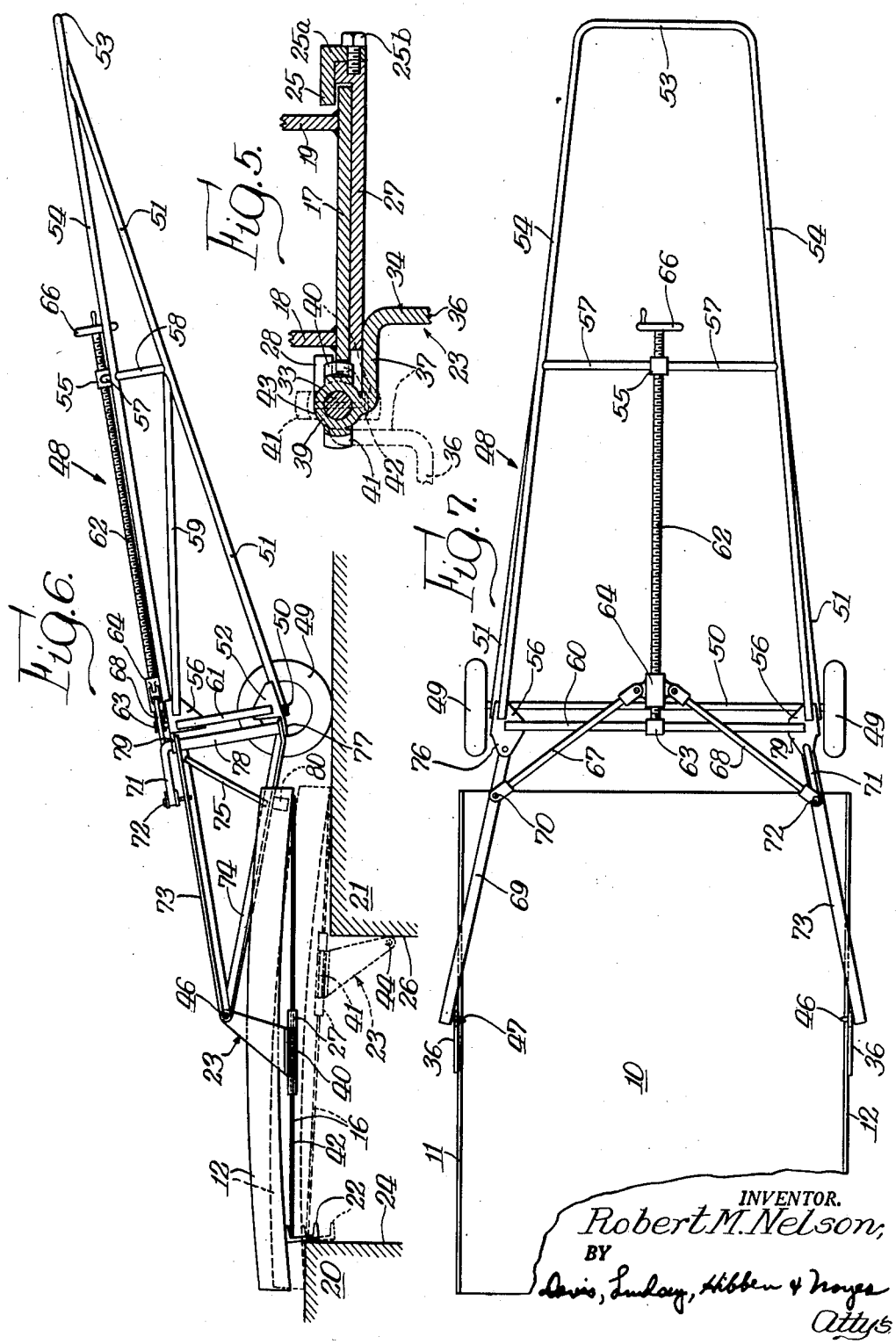

Patented Feb. 24, 1953

2,629,120

UNITED STATES PATENT OFFICE 2,629,120

DOCK PLATE

Robert M. Nelson, Wilmette, Ill.

Application July 22, 1947, Serial No. 762,560

4 Claims. (Cl. 14—72)

This invention relates to dock plates, running boards, ramps and the like for the bridging of gaps between loading areas such as loading platforms, freight cars, wharves and docks and over which heavy loads on dollies or trucks may be wheeled, and also to a dolly or truck construction especially designed for the lifting and transportation of the dock plate itself.

Heretofore, various forms of dock plates have been constructed and utilized on loading platforms and the like for the bridging of gaps between loading areas, but up to the advent of the present invention each form has had one or more disadvantages which have rendered it undesirable commercially. However, in spite of their drawbacks, the use of such older forms has continued for want of a satisfactory solution. One prevalent form has comprised merely a rectangular flat steel plate of thick and heavy construction, but it has long been recognized that such form had a relatively low load capacity and readily took a permanent set in the form of a belly when a heavy load was transported thereover. To resist such permanent set the thickness of the flat plates was increased with relatively improved results as far as resistance to distortion was concerned, but at the same time such plates became so heavy and cumbersome as to be almost unmanageable by a single operator. As a consequence, when they were being placed in or removed from bridging position serious accidents, including ruptures and injuries to the hands or feet of operators often occurred. Because of their great weight, the services of two operators were required to handle the dock plates and this resulted in a waste of manpower and increased loading costs. Moreover, the disadvantages of such heavy plates were further multiplied and increased when a large number were used in one area and were required to be moved from place to place many times a day.

Other forms, in order to prevent the distortion thereof, were provided with some form of supporting and reinforcing structure on the under surface thereof but such reinforcing structure tended to increase the weight of the dock plate unduly and prevented it from being utilized across narrow gaps between loading areas, since the under structure projected downwardly below the end edges of the main plate and rested on the surfaces of loading areas causing the end edges to assume an elevated position and thereby preventing free movement of a vehicle thereover. The under structures of such older forms of dock plates also failed in some instances to reinforce the top plate to prevent distortion thereof while others were extremely heavy, were insecurely attached to the top plate, or were of such a construction as to render assembly difficult and expensive.

Likewise, some older forms utilized stop means to prevent movement and slippage of the dock plate in angular directions relative to the loading areas under the rolling thrust of a loaded wheeled vehicle. But such stop means were often inaccessible and difficult to manipulate. They were likewise subject to damage when the dock plate was in storage and not in use, since they projected downwardly and engaged the floor of the storage area, thereby supporting the full weight of the dock plate. Where a stop was of the movable type, the weight of the dock plate caused distortion which was particularly serious since the parts became so bent or sprung as to prevent ready movement of the stops when adjustment was desired.

It was further found to be extremely difficult to move the heavy dock plates by hand from place to place because of their great bulk and weight and this difficulty was enhanced where only a few dock plates were employed at a location involving many widely separated loading areas and thus requiring frequent movement thereof from place to place during a working day. However, in spite of the existence of the problem, no satisfactory and readily operable vehicles have been devised by which dock plates could be easily lifted, transported and deposited in operable position and removed therefrom with a minimum of effort by a single operator.

Therefore, one of the principal objects of the present invention is to provide an improved form of dock plate in combination with an improved form of dolly or vehicle for transporting the dock plate.

Another object of the present invention is to provide in combination an improved dock plate having means adapted to be engaged by engaging means of a dolly and a dolly for transporting said dock plate.

Still another object is to provide an improved dock plate having a top plate, upstanding side walls at the side edges of the top plate to resist distortion of said plate and confine vehicles being moved thereover, and a rigid understructure of simple, strong and inexpensive construction.

A further object of the invention is to provide a dock plate having spaced and depending stops on the under side thereof for preventing slippage of the dock plate, at least one of the stops being adjustable and mounted for movement from depending position to raised position so as to be removed from interfering position when the dock plate is being stored and so as to serve as handle means adapted to be engaged with a dolly for the transportation of the dock plate.

Another further object is to provide a dock plate of simple and relatively inexpensive construction that can be produced in quantity and owned and used in quantity and which is adaptable to all operating conditions and eliminates the necessity of various styles and sizes for a loading area having various loading conditions.

A still further object is to provide a dock plate having depending spaced stops on the underside thereof, one of said stops being fixed and the others of said stops being adjustable longitudinally of the plate and pivotally mounted adjacent the respective side edges thereof for ready access by an operator and for swinging movement from depending to raised position, and a dolly comprising a pair of spaced and forwardly extending movable arms adapted to be engaged with and disengaged from said upturned stop means and to be remotely controlled by the operator in a position at the rearward end of the dolly.

Another further object is to provide a dolly which may be readily engaged with a dock plate by remote control and by which a dock plate may be readily lifted and transported from one loading area to another or to storage, said dolly providing sufficient leverage to facilitate ready lifting of a dock plate and further providing a portion adapted to engage one end of the dock plate in elevated position to prevent lateral movement or side sway during transportation thereof.

Other and further objects and advantages of the present invention will become apparent as this description progresses, reference being had to the accompanying drawings, in which:

Figure 1 is a perspective view of a dock plate comprising a preferred embodiment of the present invention as viewed from the under side thereof;

Fig. 2 is a transverse, vertical sectional view of the dock plate taken on the line 2—2 in Fig. 1, looking in the direction of the arrows;

Fig. 3 is a side elevational view of a broken away section of the dock plate showing the adjustable stop means on one side thereof in depending operable position;

Fig. 4 is a horizontal sectional view taken on the line 4—4 in Fig. 3, looking in the direction of the arrows;

Fig. 5 is an enlarged vertical sectional view of the broken away portion of the dock plate shown in Figs. 3 and 4;

Fig. 6 is a side elevational view of the dock plate shown in Figs. 1 to 5, inclusive, and of a dolly or wheeled lifting device, and showing the manner in which the dolly may be operably connected with the adjustable stops in their up or vertical position for readily transporting the dock plate to and from gap bridging position; and Fig. 7 is a top plan view of the dock plate and dolly shown in Fig. 6 with a portion of the dock plate broken away.

As shown more particularly in Figs. 1, 2 and 6 of the drawings, the dock plate comprising a preferred embodiment of the present invention comprises a convex tread plate 10 that is longitudinally curved from end to end so as to have its high point at substantially the longitudinal center thereof. This plate 10 which is rectangular in shape, may be of varying dimensions so as to be adaptable to different operating conditions and sizes of gaps to be bridged, and may be composed of a non-ferrous metal, such as an aluminum or magnesium alloy, as may the remainder of the parts thereof to be described hereinafter, in order to achieve lightness in weight, although it is to be understood that other types of metals may be used with satisfactory results. Along its longitudinal side edges the curved plate 10 is provided with integrally formed, upstanding flanges or side walls 11 and 12 which serve not only to stiffen the plate 10 but also to prevent freight-carrying vehicles from running off the sides thereof and to insure the personal safety of the operator. If desired, however, the side walls 11 and 12 may be of separate construction from the plate 10 and secured thereto by any suitable means such as by welding or riveting.

Secured to the under surface of the curved plate 10, such as by welding or other suitable means, are three longitudinally extending strengthening beams 13, 14 and 16 which are transversely spaced from each other, the beams 13 and 16 being positioned adjacent the side edges of the plate 10 and the beam 14 being secured along the center line thereof. Each of the beams 13, 14 and 16 are of simple, strong and inexpensive construction, being box-shaped and comprising horizontal plate members 17 and upstanding and transversely spaced vertical plate members or ribs 18 and 19, which plate members and ribs may be integrally formed or cast as a unit or may be welded together prior to being secured to the under surface of the plate 10.

The vertical plate members 18 and 19 are positioned inwardly from the side edges of the horizontal plate members 17 and their top edges are curved in conformity with the top plate 10, each tapering down to substantially feather edges at one of their ends, and their bottom edges are straight for engagement with the plate members 17. The ends of the plate members 17 corresponding with the feathered ends of the vertical plate members 18 and 19 are secured to the under surface of the top plate 10, while the other end of the vertical plate members and the horizontal plate members are rigidly secured to the inner and under surface of the channel shaped stop member 22, rigidly secured to the under surface of the dock plate. By means of this solid rigid connection, the ends of the plate members 17, 18 and 19 are in operable effect secured to the under surface of the dock plate and serve to tie the end portions of the top plate together.

The beams 13, 14 and 16 do not project below the plane of the end edges of said plate 10 and by confining the beams 13, 14 and 16 within the curvature of the plate 10, the plate 10 will always rest only upon its end edges without interference from the underneath beams regardless of whether the gap across which the dock plate is placed is wide or narrow. If the beams were of a greater height so as to project below the plane connecting the end edges of the plate 10, the beams rather than the edges of the plate would rest upon the sides of the gap when placed thereacross, thus holding the end edges of the plate 10 in an elevated position and preventing passage of a wheeled vehicle thereover.

By the foregoing construction the tread plate 10 is the compression member and the bottom plates 17 of the beams 13, 14 and 16 are the tension members. Since the ends of the plate 10 are thus tied together and since the vertical ribs 18 and 19 prevent buckling, the dock plate possesses extreme strength and capacity for its weight. A further advantage is that the curved plate 10 may still rest upon its end edges even though one side of the gap being bridged may be higher than the other. As shown in Fig. 6, the top surface of the loading area 20 is higher than the top surface of the area 21, but because the supporting beams are within the curvature of the plate 10 and terminate short of the end edges thereof, the end edges of the plate 10 are in complete engagement with the loading area surfaces.

In order to prevent movement of the dock plate in a longitudinal or angular direction relative to the edges of the loading platforms, docks, freight car floors, etc., shown somewhat diagrammatically in Fig. 6 of the drawings and indicated by the reference numerals 20 and 21, the dock plate is provided with spaced stop members 22 and 23 which are adapted to project downwardly below the beams 13, 14 and 16 so as to engage the vertical sides 24 and 26 of the loading areas 20 and 21, respectively. The stop member 22, which extends transversely of the dock plate 10, is permanently and rigidly secured, as by welding or other suitable means, to the under surface of the curved plate 10 at the ends of the beams 13, 14 and 16 and is channel shaped with one side of the channel secured to the plate 10 and the bottom wall thereof adapted to engage against the top edge and vertical wall 24 of the loading area 20. Thus when the dock plate is placed in gap-bridging position between the loading areas 20 and 21, it is pushed over the upper surface of the loading area 20 until the stop 22 engages the edge and the vertical wall 24 thereof. When the plate is in this fully pushed-up position, the depending movable stop members 23, which are positioned along the side edges of the beams 13 and 16, are moved longitudinally away from the stop 22 until they each engage the vertical face 26 of the loading area 21. With the stops 22 and 23 in engagement with the vertical walls 24 and 26 of the loading areas 20 and 21 any longitudinal or angular movement of the dock plate relative to the loading areas under extremely heavy thrusts and stress during use thereof is prevented.

The movable stops 23 which are of identical construction are slidably mounted on the beams 13 and 16 for longitudinal movement therealong. Each comprises a flat, channel-shaped slide 27 extending under the horizontal beam plate 17 and having inturned flanges 25 and 28 in engagement with and supported by the projecting side portions of said beam plate. The spaced flanges 28 on the outer side of the slide 27 are integrally formed on spaced bearing members 29 and 30 while the flange 25 forms a portion of an angle iron 25a secured to the inner side of the slide by set screws 25b. The slide 27 and its flanges 25 and 28 are so fitted and adjusted to the beam plate 17 that it may be readily moved therealong when longitudinal adjustment of the stop 23 is required. The slide 27 is also provided at its outer side and at each end thereof with two spaced projecting bearing members 29 and 30 having aligned bores 31 and 32, respectively, extending longitudinally therethrough into which is received a hinge or pivot pin 33.

An angular plate 34 having a triangularly shaped vertical portion 36, a horizontally extending portion 37 and an enlarged hub portion 39 through which the pivot pin 33 extends, is pivotally supported for pivotal movement from a lower depending position to a raised upwardly extending position illustrated by the full and broken lines in Figs. 2 and 6 of the drawings. In its depending position the plate 34 serves as a stop for the dock plate while in its upwardly directed position it serves as a handle means by which the entire dock plate may be engaged and transported by a leverage dolly. Because of its angular construction, the plate 34, when in depending position, does not project outside of the side edges of the beams 13 and 16 and of the curved plate 10 so as to cause interference during use of the dock plate, and the horizontal portion 37 engages the under surface of the top plate so as to be supported thereby during use. In addition, when the stop 23 is swung about its pivot 33 to its upward position, the plate 34 will clear the projecting side edges of the curved plate 10. In this raised position the vertical portion 36 of the plate 34 will engage and bear against the outer surface of the vertical side walls 11 and 12 thereof, respectively, when the dolly arms are moved inwardly, and because of this latter bearing engagement, the weight of the dock plate is relieved somewhat from the hinge points 33 of the stops 23 and the possibility of relative lateral movement therebetween is eliminated.

In order to lock the adjustable stop 23 in the desired longitudinal position along the beams 13 and 16, each is provided with locking means which are operable when the stop is either in its depending or its raised, upward positions but which are inoperable when the stop is in its horizontal position and thereby permitting longitudinal adjustment thereof. This locking means, as shown in Figs. 1 to 5, inclusive, of the drawings, may comprise a plurality of gear teeth 40 and 41 cut in the opposite sides of the hub portion 39 of the angular stop plate 34, which teeth are adapted to mesh with teeth 42 cut in the side edges of the horizontal plates 17 of the beams 13 and 16 so as to comprise an integrally formed rack. The upper portion 43 of the hub 39 is of such reduced size as compared to the teeth 40 and 41 thereon that when the angular plate 34 is pivoted to a horizontal position, the hub portion 39 will be out of locked engagement with the horizontal beam plate 17 and the angular stop plate 34 and the slide 27 will be freely slidable therealong. However, when the angular plate 34 is moved to its downward position the gear teeth 40 will mesh with the teeth 42 of the beam plate 17, and when the angular plate 34 is in its raised, upward position the gear teeth 41 will also mesh with the teeth 42. Because of the engagement of the gear teeth 40 or 41 with the gear teeth 42, the stop 23 is locked against longitudinal movement in its depending and raised positions and longitudinal adjustment thereof may be accomplished only by the conscious act of the operator in holding the angular plate 34 outwardly in horizontal position and moving it in the desired direction. It is to be noted that in place of the interengaging teeth 40, 41 and 42, other locking means, such as a beam clamp employing a camming action, may be utilized with satisfactory results. Because of their proximity to the side edges of the top plate 10, the stops 23 are readily accessible to the operation for manipulation and adjustment thereof.

The angular plates 34 of each stop 23 are each provided with an opening 44 through the extreme end portions thereof into which may be projected the inturned pick-up pins 46 and 47 of a leverage dolly 48, shown in Figs. 6 and 7 of the drawings, when it is desired to move the dock plate to another location upon completion of its use. The dolly 48, which may be utilized with existing dock plates upon provision of said plates with engaging means, comprises a frame supported on two wheels 49 rotatably mounted on the projecting ends of an axle 50 which project outwardly from the sides of the forward ends of elongated lower side rods 51 on each side of the dolly. The forward ends of the side rods 51 are secured in lower blocks 52 and extend rearwardly and upwardly, their rear ends being secured to a transverse handle rod 53 adapted to be grasped by the operator in pushing or rocking the dolly. The handle portion 53 is integrally connected to forwardly extending and diverging upper side rods 54, whose forward ends are rigidly secured in upper blocks 56 and whose intermediate portions are connected by transverse rods 57, the rods 57 at their inner ends being secured in a bearing member 55. Vertical bracing rods 58 are secured to and between the side rods 51 and 54 and diagonal bracing rods 59 extend downwardly and rearwardly from the upper blocks 56 to the intermediate portions of the side rods 51. A transverse rod 60 is rigidly secured in and extends between the upper blocks 56 and the upper and lower bearing blocks 56 and 52, respectively, on the respective sides of the dolly are rigidly connected by vertical rods 61 received within the said blocks. The foregoing elongated side and cross rods being rigidly secured in the blocks 56 and 52 and to each other form a strong, rigid but light framework having a long operating leverage for lifting the dock plate.

A threaded shaft 62 extends longitudinally of the dolly through the bearing member 55 and has its forward end retained and rotatably supported within a bearing member 63 mounted on the transverse rod 60. A follower 64 is mounted on the screw threaded shaft 62 at the forward end thereof and in threaded engagement therewith and is adapted to move longitudinally upon rotation of the screw 62, such rotation being effected by rotation of a wheel 66 fixed on the end of the screw 62 in a position accessible to the operator standing back of the handle 53. A pair of links 67 and 68 are pivoted to the respective sides of the follower 64 and extend forwardly and outwardly therefrom. The forward end of the link 67 is pivoted to a dock plate supporting arm 69 by means of a pin 70 while the forward end of the link 68 is pivoted to the forward end of a short lever 71 by means of a removable pin 72 which extends downwardly into engagement with a dock plate supporting arm 73 and causes the arm 73 and the short lever 71 to swing as a unit. The dock plate supporting arms 69 and 73 on the respective sides of the dolly have their respective forward ends secured to the forward ends of diagonal arms 74, 74, the rearward ends of the connected arms 69 and 74 being pivoted to forwardly projecting bearing plates 76 and 77 of the bearing blocks 56 and 52, respectively, and the rearward ends of the connected arms 73 and 74 being rigidly secured to the upper and lower ends of a vertical tubular member 78 rotatably supported on the vertical shaft of the short lever 71 between the forwardly projecting bearing plates 79 and 77 of the blocks 56 and 52, respectively. Braces or struts 75 extend diagonally between the upper and lower arms 73 and 74 and 69 and 74 and serve to maintain the arms in assembled position and to support the load at 80, as shown in Fig. 6, when the end of the dock plate presses thereagainst in elevated position.

When use of the dock plate has been completed and it is desired to remove it to another location for reuse or for storage, the operator will first swing the adjustable stops 23 into their horizontal position so as to disengage the gear teeth and then longitudinally along the beams 13 and 16 until they are in the desired position between the center of gravity of the dock plate and the end of the dock plate adjacent the dolly 48. When this position has been reached, the stops 27 may then be swung another 90° into their upward position, shown in Fig. 6, after which the dolly 48 may be rolled into position and its handle portion 53 raised up so that the pick-up pins 46 and 47 of the supporting 69 and 73 arms are lowered into substantial alignment with the openings 44 of the stops 23. Such alignment can readily be accomplished by the operator from the remote position at the rear handle 53. The operator may then rotate the wheel 66 in the proper direction so as to cause the dock plate supporting arms 69, 74 and 73, 74 to be moved inwardly by means of the screw 62, the follower 64, the links 67, 68 and 71. Inward movement of the arms is continued by further rotation of the wheel 66 until the pins 46 and 47 have entered and have passed through the holes 44 of the stops 23.

When the dolly has been so engaged with the dock plate in the foregoing manner, the operator merely pushes down on the handle portion 53 and, because of the great leverage afforded by the long side rods 54 and 51, the dock plate is readily raised from the surfaces of the loading areas 20 and 21. As the dock plate is lifted, its near end, being on the light side due to the positioning of the stops 23 on one side of the center of gravity, is first raised and this raising movement of the near side continues until the upper surface of the curved plate 10 near the end thereof engages a bumper 80. Thereafter, continued rocking movement of the dolly 48 will lift the entire dock plate from the loading areas 20 and 21 and it may then be turned on its wheels and pushed by the operator to another location. If the other location should be storage, the operator merely raises the rear handle portion 53 so as to deposit the dock plate gently on a storage surface after which he turns the wheel 66 to spread apart the arms and withdraw the pins 46 and 47 from the stops 23. Since the adjustable stops 23 are in their upward position, they do not support the weight of the dock plate and hence are not subject to damage during the period of non-use. Furthermore, they are in proper pin-receiving position for movement by the dolly when reuse of the dock plate is required.

In order to facilitate storage of the dolly 48, the operator may readily remove the pin 72 so as to disengage the short lever 71 from operable connection with the lifting arm 73 and permit the arm 73 to be folded transversely back against the cross rod 60. By making this disconnection the arm 69 may also be folded transversely against the arm 73, this latter folding movement being accomplished by rotation of the wheel 66 to retract the follower 64 to an extreme rearward position. With the arms in this folded position, the operator may then turn the dolly on end in vertical position against a wall with the arms 73 and 69 in down position, thereby consuming little storage space in spite of its large lifting capacity. The dolly can readily be restored to operable condition merely by moving the arms 73 and 69 back into their normal position and reinserting the pin 72 so as to reestablish the connection between the arm 73 and the short lever 71.

It must therefore be manifest from the foregoing description and accompanying drawings that by the present invention a vastly improved form of dock plate has been devised in combination with an especially designed dolly by which the dock plate may be moved from one loading area to another over relatively long distances many times a day by the efforts of but one operator. The dock plate itself is of safe, strong and inexpensive construction and is relatively light in weight. The simple but efficient understructure in combination with the integrally formed side walls of the top plate 10 serve to prevent all distortion or bellying of the top plate, and the effective construction of the stops 22 and 23 prevents any slippage whatsoever of the plate relative to the loading areas. In addition to being positive in their action, the stops 23 are readily accessible to the operator and may be adjusted longitudinally or raised upwardly for engagement with the dolly with a minimum of effort. Moreover, the engagement of the dolly with the stops 23 may be so quickly accomplished by a single unskilled workman, that little time is lost in moving the dock plate about loading areas, the net result being maximum consumption of available loading time and low labor costs.

Although there has been shown in the drawings and described above preferred embodiments of the dock plate and cooperating dolly comprising the present invention, it is apparent that changes in details of construction and operation may be made without departing from the spirit and scope of the appended claims.

I claim:

1. A dock plate for bridging a gap between two loading areas comprising a top plate, a plurality of spaced stops secured on the under side of said dock plate and extending downwardly therefrom, one of said stops being adjustable longitudinally and mounted for swinging movement in a vertical plane from depending position to raised position, and locking means for retaining said adjustable stop against longitudinal movement in both its depending and raised positions, said locking means comprising a fixed locking member rigidly carried at the under side of said dock plate and oppositely extending complementary locking members carried on the swingable stop and adapted to be engaged with said fixed locking member in both the depending and raised positions of said swingable stop but being disengaged therefrom in an intermediate position.

2. A dock plate for bridging a gap between two loading areas comprising a top plate, a plurality of transversely spaced and longitudinally extending beams secured to the under surface of said top plate, at least one of said beams being disposed adjacent one edge of said plate, a plurality of spaced stops secured on the under side of said dock plate and extending downwardly therefrom for engagement with the vertical faces of opposed loading areas, one of said stops being adjustable longitudinally along said one beam and comprising a slide mounted on said one beam, an elongated member pivoted to said slide for swinging movement in a vertical plane from depending position to raised position, and locking means for retaining said slide against longitudinal movement in both depending and raised positions and adapted to be disengaged upon swinging movement of said elongated member in a vertical plane from depending or raised position to a position angular thereto, said locking means comprising rack means on said one beam and cooperating teeth on said pivoted elongated member.

3. A dock plate for bridging a gap between two loading areas comprising a top plate, a plurality of transversely spaced and longitudinally extending beams secured to the under surface of said top plate, at least one of said beams being disposed adjacent one edge of said top plate and being provided with an outwardly extending flange having teeth at its outer side edge, a plurality of spaced stops secured on the under side of said dock plate and extending downwardly therefrom for engagement with the vertical faces of opposed loading areas, one of said stops being adjustable longitudinally along said one beam and comprising a slide mounted on said flange, an elongated member pivoted at one end to said slide adjacent said flange for swinging movement in a vertical plane and having teeth on one side of its pivoted end adapted to engage the teeth on said flange whereby said stop is restrained against longitudinal movement in depending position and may be moved longitudinally when it is pivoted in a vertical plane to disengage said teeth.

4. A dock plate for bridging a gap between two loading areas comprising a top plate, a plurality of transversely spaced and longitudinally extending beams secured to the under surface of said top plate, at least one of said beams being disposed adjacent one edge of said top plate and being provided with an outwardly extending flange having teeth at its outer side edge, a plurality of spaced stops secured on the under side of said dock plate and extending downwardly therefrom for engagement with the vertical faces of opposed loading areas, one of said stops being adjustable longitudinally along said flange and comprising a slide mounted on said flange, an elongated member pivoted at one end to said slide adjacent said flange for swinging movement in a vertical plane and having teeth on the opposite sides of its pivoted end adapted to engage respectively the teeth on said flange when said elongated member is in depending position and in raised position whereby said adjustable stop may be restrained against longitudinal movement in both its depending and raised positions.

ROBERT M. NELSON.

REFERENCES CITED

The following references are of record in the file of this patent:

UNITED STATES PATENTS

| Number | Name | Date |
|---|---|---|
| 555,542 | Throop | Mar. 3, 1896 |
| 797,902 | Martin | Aug. 22, 1905 |
| 1,131,783 | Howard | Mar. 16, 1915 |
| 1,681,944 | Marshall, Jr. | Aug. 28, 1928 |
| 2,031,631 | Bemis | Feb. 25, 1936 |
| 2,079,719 | Schuetze | May 11, 1937 |
| 2,086,318 | Jackson | July 6, 1937 |
| 2,362,749 | Gall et al. | Nov. 14, 1944 |
| 2,424,876 | Butler | July 29, 1947 |
| 2,433,754 | Belko | Dec. 30, 1947 |
| 2,452,222 | Bryson | Oct. 26, 1948 |
| 2,452,289 | Bryson | Oct. 26, 1948 |
| 2,461,678 | Christensen | Feb. 15, 1949 |